United States Patent
Pollesel et al.

(10) Patent No.: US 6,696,614 B2
(45) Date of Patent: Feb. 24, 2004

(54) CATALYST FOR STEAM CRACKING REACTIONS AND RELATED PREPARATION PROCESS

(75) Inventors: Paolo Pollesel, Milan (IT); Caterina Rizzo, Milan (IT); Carlo Perego, Milan (IT); Renato Paludetto, Milan (IT); Gastone Del Piero, Milan (IT)

(73) Assignees: ENICHEM S.p.A., San Donato Milanese (IT); ENITECNOLOGIE S.p.A., San Donato Milanese (IT)

( * ) Notice: Subject to any disclaimer, the term of this patent is extended or adjusted under 35 U.S.C. 154(b) by 0 days.

(21) Appl. No.: 10/309,145

(22) Filed: Dec. 4, 2002

(65) Prior Publication Data

US 2003/0109376 A1 Jun. 12, 2003

Related U.S. Application Data

(62) Division of application No. 09/736,306, filed on Dec. 15, 2000, now abandoned.

(30) Foreign Application Priority Data

Dec. 17, 1999 (IT) .......................................... MI99A2616

(51) Int. Cl.[7] ................................................ C07C 6/00
(52) U.S. Cl. ........................ 585/653; 585/500; 585/648; 585/650; 585/651; 585/652; 208/113; 208/121; 208/122; 208/125; 208/130
(58) Field of Search ................................ 585/500, 648, 585/650, 651, 652, 653; 208/113, 121, 125, 122, 130

(56) References Cited

U.S. PATENT DOCUMENTS 3,969,542 A * 7/1976 Tomita et al. ............... 502/250
4,331,451 A * 5/1982 Isogaya et al. ............ 48/214 A

FOREIGN PATENT DOCUMENTS

EP 0 323 178 * 5/1989

OTHER PUBLICATIONS

M. Matsuda, Journal of Maerials Science Letters, vol. 15, No. 11, pp. 933–934, "Conduction Properties of Oxide Ion Conductor Ca Al 0 Prepared with Solution–Synthesized Powders", Jun. 1, 1996.*

A. K. Nandi, et al., British Ceramic Transactions, vol. 92, No. 2, pp. 81–82, "A New Approach to the Preparation of IR Transparent Ca Al 0 Material", 1993 (No month).*

Anonymous:Internet Article, 'Online!, XP 002184410, Retrieved from the Internet: <URL: http://webmineral.com/data/mayenite.shtml>, pp. 1–2, "Mayenite:Mineral Data Pronunciation Guide", Oct. 8, 2001.*

S. Nowak et al., "New Routes to Low Olefins From Heavy Crude Oil Fractions," *Catalysts in Petroleum Refining*, Elsevier Science Publishers, B.V., Amsterdam—1989 (103–127), no month.

(List continued on next page.)

*Primary Examiner*—Elizabeth D. Wood
(74) *Attorney, Agent, or Firm*—Oblon, Spivak, McClelland, Maier & Neustadt, P.C.

(57) ABSTRACT

Catalyst for steam cracking reactions consisting of pure mayenite having the general formula:

$$12CaO.7Al_2O_3$$

having an X-ray diffraction spectrum as indicated in Table I, obtained with a preparation process comprising the following steps:

- dissolution of salts containing calcium and aluminum with water;
- complexing of the dissolved salts by means of polyfunctional organic hydroxyacids;
- drying of the solution resulting from the completing in order to obtain a solid precursor product;
- calcination of the solid precursor product at a temperature ranging from 1300 to 1400° C. for at least two hours.

8 Claims, 2 Drawing Sheets

XRD SPECTRUM MAYENITE PHASE

OTHER PUBLICATIONS

Biswadip Basu et al., "Catalytic Pyrolysis of Naphtha," *Ind. Eng. Chem. Res.*, 31, (1992), 146–155, no month.

Katsutoshi Kikuchi et al., "A New Catalytic Cracking Process," *Toyo Engineering Corp., Chiba 297, Japan*, pp. 54–58, CEP, Jun. 1985.

A.A. Lemonidou et al., "Catalyst Evaluation and Kinetic Study for Ethylene Production," *Aiche Spring National Meeting*, Houston, Mar. 29–Apr. 2, 1987.

A.A. Lemonidou, et al., "Preparation and Evaluation of Catalysts for the Production of Ethylene via Steam Cracking Effect of Operating Conditions on the Performance of 12Cao–7Al$_2$O$_3$ Catalyst," *Applied Catalysts*, (54) 119–138, 1989 (Elsevier Science Publishers B.V.), no month.

* cited by examiner

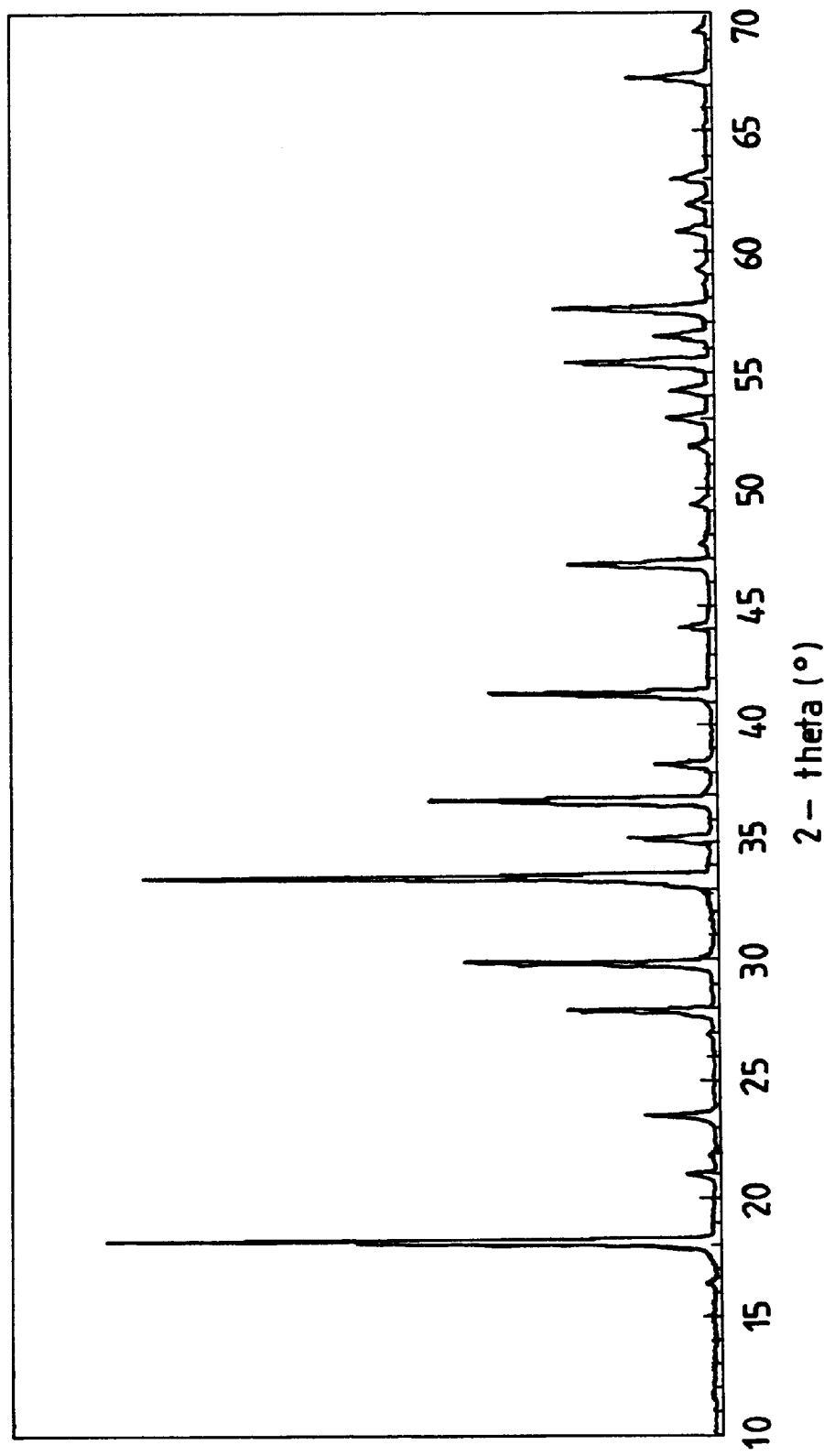

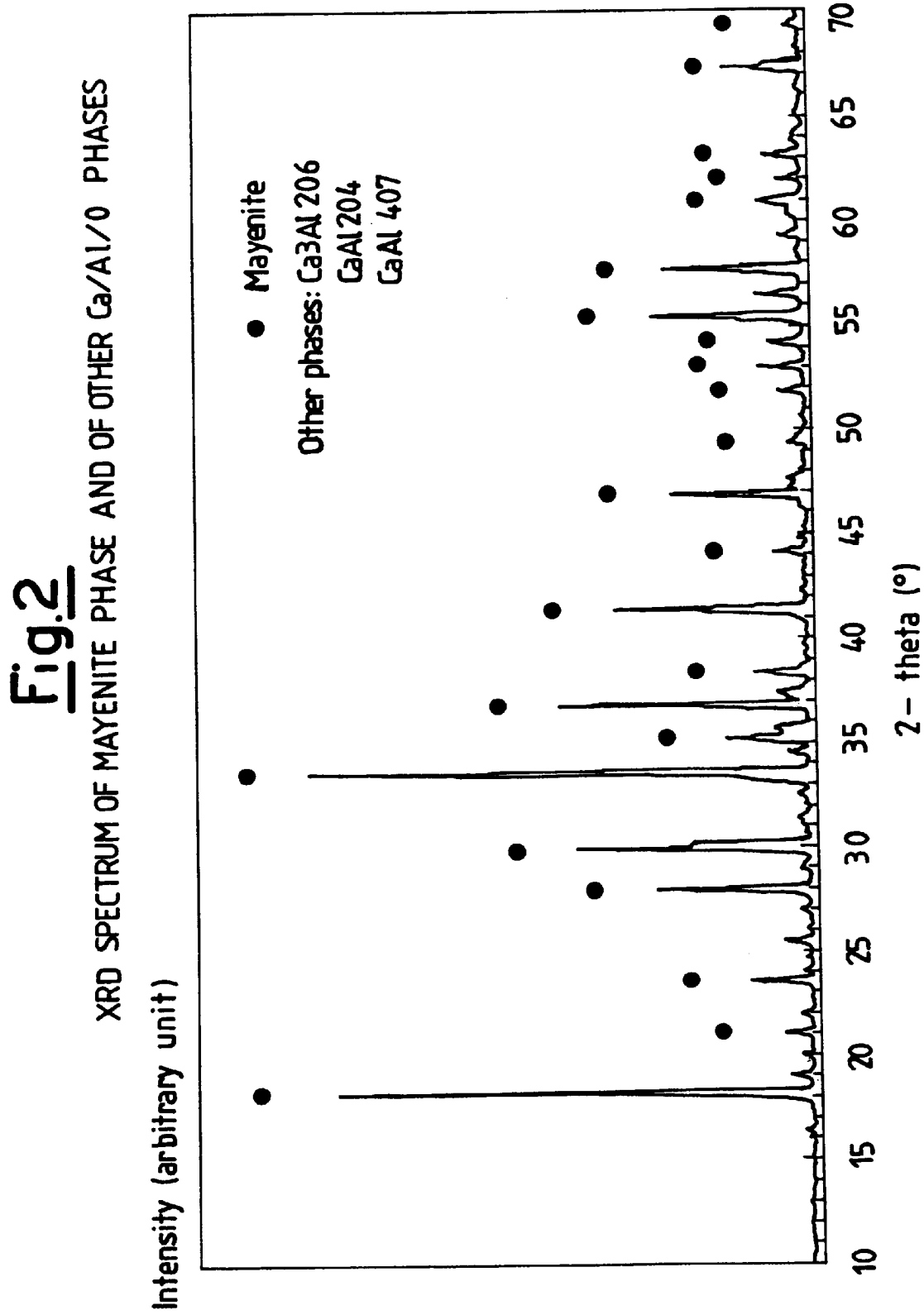

CATALYST FOR STEAM CRACKING REACTIONS AND RELATED PREPARATION PROCESS

The present invention relates to a catalyst for steam cracking reactions and the related preparation process.

The most widely-used method for the production of light olefins, in particular ethylene and propylene, is the steam cracking process, in which a hydrocarbon charge is heated, in the presence of water vapor, in specific ovens to produce a gaseous stream rich in olefins. Steam cracking is a thermal process which is carried out on an industrial scale without catalysts. The setting up of a catalytic system which allows an increase in the yields to the desired products would provide important advantages; owing to the large volumes of products in question (for example the world-wide production of ethylene is over 70 Mton/year), even small percentage increases in the yield would have a great impact on process economy.

The use of catalysts for steam cracking reactions has not been widely studied, even if various companies and research groups have occasionally worked in this area since the 70s'. In some cases a process has been defined but industrial applications are not known at the moment.

Among the most significant references are the following, which identify calcium-aluminate compounds in which the $12CaO.7Al_2O_3$ (mayenite) phase prevails, as the most active materials for the catalysis of naphtha cracking:

A. A. Lemonidou, I. A. Vasalos, Applied Catalysis, 54 (1989), 119–138;
A. A. Lemonidou, I. A. Vasalos, Proc. 1987 AIChE Spring National Meeting, Houston, Mar. 29–Apr. 2, 1987;
K. Kikuchi, T. Tomita, T. Sakamoto, T. Ishida, Chemical & Engineering Progress, 81 (1985) 6, 54.
B. Basu, D. Kunzru, Industrial & Engineering Chemistry Res., 1992, 31, 146–155.

Another reference has also demonstrated the good performance of materials consisting of Ca-aluminate mixtures:
S. Nowak, G. Zimmermann, H. Gushel, K. Anders, in "Catalysis in Petroleum Refining 1989" (D. L. Trimm et al. Eds.), Elsevier Science Publishers B.V., 1990.

As far as studies relating to industrial development are concerned, mention can be made of Asahi Chemical which claims a process, almost ready for commercialization, for steam cracking in a circulating bed, using a catalyst based on ZSM-5 and ZSM-11 zeolites, charged with metals such as Fe, Mg and/or Ib metals. This process partially increases the yield to ethylene, but the reaction is mainly directed towards the production of propylene and aromatics. Recent information (PERP Report 96/97S12—Chem Systems, September 1997) reveals that the process still has several problems of a technological nature to be solved, among which many aspects relating to the catalyst (activity, regeneration, duration), before it can be actually commercialized. More or less the same situation also applies to the Russian process of Vniios (Research Institute for organic syntheses), which uses potassium vanadate supported on corindone/mullite as catalyst, with the addition of promoters. Exxon has patented a process using an inert solid as heat transporter or catalysts based on mixed oxides of Mg, Ca, Mn, Be, Sr, Ce, V, Cs (W. Serrand et al., WO 97/31083). This process however is preferably designed for heavy charges (e.g. >500° C.) and comprises, in fact, a particular type of horizontal moving bed reactor with two rotating screws which help the movement of the charge.

A technology which seems closer to a possible industrial application is the Pyrocat process, set up by Veba Oel and Linde (M. Wyrosteck, M. Rupp, D. Kaufmann, H. Zimmermann, Proc. 15$^{th}$ World Petroleum Congress, Beijing, Oct. 12–16, 1997). This technology comprises implementation of steam cracking plants without modifying the design of the ovens. The idea is based on coating the inside of the cracking tubes with a solid layer having a catalytic effect and which inhibits the formation of coke, thus prolonging the times between subsequent stoppages for decoking operations. The catalyst is based on $Al_2O_3/CaO$ and contains, as gasification promoter, compounds of alkaline metals. The technology however can only be applied to conventional cracking plants, operating with conventional charges.

It can therefore be seen from literature that catalysts based on calcium aluminates can be used in steam cracking reactions for the production of ethylene and propylene. The calcium aluminates which can be formed are the following, in increasing order of calcium content: $CaO.6Al_2O_3$, $CaO.2Al_2O_3$, $3CaO.5Al_2O_3$, $CaO.Al_2O_3$, $5CaO.3Al_2O_3$, $12CaO.7Al_2O_3$, $2CaO.Al_2O_3$ and $3CaO.Al_2O_3$ but it is not disclosed in literature which is the preferred crystalline phase for steam cracking reactions. In fact, according to Lemonidou (A. A. Lemonidou, I. A. Vasalos, Applied Catalysis, 54 (1989), 119–138) the most effective catalyst is a mixture of calcium-aluminates in which the prevalent compound is mayenite ($12CaO.7Al_2O_3$); S. Nowak, on the other hand, has patented a catalyst (DD-243 647 of 1987) in which the preferred phases have a lower content of calcium oxide: $CaO.Al_2O_3$ and $CaO.2Al_2O_3$.

The preparation of these catalysts is generally effected by the mechanical mixing of the oxides or their aluminum and calcium precursors and subsequent calcination at a high temperature. This process generally leads to the formation of materials in which there are several phases, even if in some cases one phase may be distinctly prevalent with respect to the others. No information is provided however in scientific literature with respect to this type of catalyst, on the production of pure calcium-aluminate materials by means of the syntheses described.

We have now found a process for obtaining pure mayenite ($12CaO.7Al_2O_3$), which surprisingly allows better results to be obtained in terms of yield to light olefins in the field of naphtha steam cracking reactions with respect to mixtures containing mayenite and other calcium-aluminates either pure or mixed with each other.

BRIEF DESCRIPTION OF THE DRAWINGS

FIG. 1 is an XRD spectrum of mayenite phase.

FIG. 2 is an XRD spectrum of mayenite phase and of other Ca/Al/O phases.

The catalyst for steam cracking reactions, object of the present invention, is characterized in that it consists of pure mayenite having the general formula:

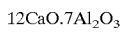

$$12CaO.7Al_2O_3$$

which has, in its calcined form, an X-ray diffraction spectrum, registered by means of a vertical goniometer equipped with an electronic impulse count system and using CuKα radiation (λ=1.54178 Å), containing the main reflections indicated in Table 1 (wherein d indicates the interplanar distance) and in FIG. 1.

The process for the preparation of the catalyst, i.e. pure mayenite described above, is characterized in that it comprises the following steps:

dissolution of salts containing calcium and aluminum with water;

complexing of the dissolved salts by means of polyfunctional organic hydroxyacids;

drying of the solution resulting from the completing in order to obtain a solid precursor product;

calcination of the solid precursor product at a temperature ranging from 1300 to 1400° C., preferably ranging from 1330 to 1370° C., for at least 2 hours, preferably for at least 5 hours.

The polyfunctional organic hydroxyacids can be selected from citric acid, maleic acid, tartaric acid, glycolic acid and lactic acid: citric acid is preferred.

The salts containing calcium are preferably selected from calcium acetate and calcium nitrate.

Aluminum nitrate is the preferred salt containing aluminum.

It is advisable for the preparation process to be carried out with a molar ratio polyfunctional hydroxyacids/salts containing calcium and alumina ranging from 1.5 to 1.

A further object of the invention relates to the process for the production of light olefins by means of the steam cracking reaction of hydrocarbon charges selected from naphtha, in particular virgin naphtha, kerosene, atmospheric gas oil, vacuum gas oil, alone or mixed with each other, in the presence of a catalyst according to claim 1, which is effected preferably operating at a temperature ranging from 720 to 800° C., at a pressure ranging from 1.1 to 1.8 absolute Atm and for a contact time ranging from 0.07 to 0.2 sec.

Some examples are provided for a better illustration of the invention, but which should not be considered as limiting the scope of the present invention.

EXAMPLE 1

Preparation of the Catalyst

A synthesis method in homogeneous phase was used.

This method comprises the use of citric acid or polyfunctional hydroxyacids which have the function of complexing metal salts in aqueous solution. After dehydration of the aqueous solution an amorphous solid precursor is obtained, which, after thermal treatment at a high temperature, produces the desired product.

The main advantages of this technique are the following:

homogeneous mixing on an atomic scale good stoichiometric control production of mixed oxides using commercial chemical products short process times A solution of aluminum nitrate, 378.2 g of $Al(NO_3)_3 \cdot 9H_2O$ (1.008 moles) in 470 g of water was first added to a solution of calcium acetate, obtained by dissolving at room temperature 152.2 g of $(CH_3COO)_2Ca \cdot H_2O$ (0.864 moles) in 450 g of $H_2O$, followed by a solution of citric acid: 393.1 g (1.872 moles) in 375 g of water. The homogeneous solution obtained was dried by means of a spray-dryer. The desired product $12CaO \cdot 7Al_2O_3$ (Mayenite) was obtained in pure form after calcination at 1350° C. for 5 h.

In order to obtain a catalyst formed by means of tableting, a lubricating agent (2 wt % of stearic acid) was added; after tableting, the catalyst was subjected to an additional calcination step.

The composition of the catalyst obtained was verified by means of X-ray diffractometry, which showed the presence of the single pure $12CaO \cdot 7Al_2O_3$ phase.

(See Table 1 and FIG. 1 mentioned above).

EXAMPLE 2 (COMPARATIVE)

In this example the sol-gel method was used.

327.62 g of aluminum secbutoxide (1.33 moles) in 327.9 g of n-butanol (4.431 moles) were charged into a 2 liter three-necked flask. A solution of 200.8 g of $(CH_3COO)_2Ca \cdot H_2O$ (1.14 moles) in 598 g of $H_2O$ was added, at 80° C., under vigorous magnetic stirring, by means of a drip funnel. The gel formed was left to age for a night and then dried. The composition of the product obtained, after calcination at 1350° C. for 5 h, determined by means of X-ray diffraction, is the following: 21% $CaO \cdot Al_2O_3$, 7% $CaO \cdot 2Al_2O_3$, 3% $3CaO \cdot Al_2O_3$, 69% $12CaO \cdot 7Al_2O_3$.

In order to obtain a catalyst formed by means of tableting, a lubricating agent (2 wt % of stearic acid) was added; after tableting, the catalyst was subjected to an additional calcination step.

From Table II and FIG. 2 it can be seen that in addition to the mayenite phase, there are also the diffraction lines relating to the calcium-aluminates specified above.

EXAMPLE 3 (COMPARATIVE)

A solution of aluminum nitrate, 577.7 g of $Al(NO_3)_3 \cdot 9H_2O$ (1.540 moles) in 720 g of water was first added to a solution of calcium acetate, obtained by dissolving at room temperature 67.83 g of $(CH_3COO)_2Ca \cdot H_2O$ (0.385 moles) in 200 g of $H_2O$, followed by a solution of citric acid: 404.3 g (1.925 moles) in 380 g of water. The homogeneous solution obtained was dried by means of a spray-dryer. The desired product $CaO \cdot 2Al_2O_3$ was obtained in pure form after calcination at 1350° C. for 5 h.

In order to obtain a catalyst formed by means of tableting, a lubricating agent (2 wt % of stearic acid) was added; after forming, the catalyst was subjected to an additional calcination step.

The composition of the catalyst obtained was verified by means of X-ray diffractometry, which showed the presence of the single pure $CaO \cdot 2Al_2O_3$ phase.

EXAMPLES 4–7

Steam cracking reaction effected in a laboratory plant in continuous with a fixed bed reactor having a diameter of ½".

Operating Conditions:

Charge=Virgin Naphtha

T=775° C.

$H_2O$/charge=0.8 by weight

Residence time=0.1 s 4 tests were effected using the following materials:

quartz in granules, or inert material as reference for evaluating the catalyst performances (Example 4: comparative);

mixture of calcium aluminates prepared as described in Example 2 (Example 5: comparative);

pure $CaO \cdot 2Al_2O_3$ prepared as described in Example 3 (Example 6: comparative);

pure mayenite prepared as described in Example 1 (Example 7).

From the results provided in Table A, it can be seen that all the calcium-aluminate materials give higher performances than quartz with respect to yield to $C_2$, $C_3$, $C_4$ olefins (butenes and butadiene); pure mayenite ($12CaO \cdot 7Al_2O_3$) however provides the best result, producing the highest yield, without increasing the formation of undesired products such as coke and carbon monoxides.

TABLE A

| Example Yield (w %) | 4 quartz | 5 69% 12CaO.7Al$_2$O$_3$ 21% CaO.Al$_2$O$_3$ 7% CaO.2Al$_2$O$_3$ 3% 3CaO.Al$_2$O$_3$ | 6 Pure CaO.2Al$_2$O$_3$ | 7 Pure 12CaO.7Al$_2$O$_3$ |
|---|---|---|---|---|
| Hydrogen | 0.80 | 0.98 | 0.92 | 0.94 |
| Methane | 9.78 | 11.35 | 10.70 | 11.14 |
| Ethylene | 22.26 | 25.45 | 24.90 | 26.27 |
| Ethane | 2.23 | 2.54 | 2.41 | 2.52 |
| Propylene | 15.12 | 17.24 | 15.94 | 17.60 |
| Propane | 0.35 | 0.41 | 0.40 | 0.48 |
| Butanes | 1.31 | 1.52 | 1.19 | 2.04 |
| Butenes | 5.77 | 6.67 | 5.41 | 7.35 |
| Butadiene | 3.96 | 4.81 | 3.80 | 5.03 |
| CO + CO$_2$ | 0.11 | 0.62 | 0.16 | 0.03 |
| Tot. GAS | 61.7 | 71.6 | 65.8 | 73.4 |
| Coke | 0.8 | 0.8 | 0.7 | 0.4 |
| Tot. C$_2$, C$_3$, C$_4$ olefins | 47.11 | 54.17 | 50.05 | 56.25 |

TABLE I

X-ray diffraction spectrum of the pure Mayenite phase

| 2θ (CuKα) (°) | d (Å) |
|---|---|
| 18.18 | 4.88 |
| 21.02 | 4.22 |
| 23.52 | 3.78 |
| 27.89 | 3.196 |
| 29.87 | 2.989 |
| 33.48 | 2.675 |
| 35.17 | 2.550 |
| 36.77 | 2.442 |
| 38.33 | 2.347 |
| 41.31 | 2.184 |
| 44.10 | 2.052 |
| 46.76 | 1.941 |
| 49.30 | 1.847 |
| 51.76 | 1.765 |
| 52.96 | 1.728 |
| 54.14 | 1.693 |
| 55.30 | 1.660 |
| 56.44 | 1.629 |
| 57.56 | 1.600 |
| 60.87 | 1.521 |
| 61.95 | 1.497 |
| 62.98 | 1.475 |
| 67.19 | 1.392 |
| 69.23 | 1.356 |

TABLE II

X-ray diffraction spectrum of a sample consisting of Mayenite (main phase) and Ca$_3$Al$_2$O$_6$, CaAl$_2$O$_4$ and CaAl$_4$O$_7$.

| 2θ (CuKα) (°) | d (Å) | 2θ (CuKα) (°) | d (Å) |
|---|---|---|---|
| 12.94 | 6.84 | 43.19 | 2.093 |
| 14.32 | 6.18 | 44.14 | 2.050 |
| 16.06 | 5.52 | 44.80 | 2.021 |
| 16.40 | 5.40 | 45.36 | 1.998 |
| 18.18 | 4.88 | 46.39 | 1.956 |
| 19.01 | 4.66 | 46.81 | 1.939 |
| 19.99 | 4.44 | 47.24 | 1.923 |
| 21.02 | 4.22 | 47.69 | 1.906 |
| 21.98 | 4.04 | 48.07 | 1.891 |
| 22.80 | 3.899 | 48.85 | 1.863 |
| 23.53 | 3.777 | 49.37 | 1.844 |
| 23.99 | 3.707 | 49.60 | 1.836 |
| 24.71 | 3.601 | 50.65 | 1.801 |
| 25.42 | 3.501 | 51.83 | 1.763 |
| 26.06 | 3.416 | 53.02 | 1.726 |
| 27.00 | 3.299 | 54.20 | 1.691 |
| 27.92 | 3.193 | 55.36 | 1.658 |
| 28.24 | 3.158 | 56.51 | 1.627 |
| 29.00 | 3.077 | 57.63 | 1.598 |
| 29.23 | 3.053 | 59.32 | 1.557 |
| 29.90 | 2.986 | 59.50 | 1.552 |
| 30.10 | 2.967 | 60.40 | 1.531 |
| 31.21 | 2.864 | 60.96 | 1.519 |
| 32.14 | 2.782 | 61.99 | 1.496 |
| 32.59 | 2.745 | 62.17 | 1.492 |
| 33.22 | 2.695 | 63.09 | 1.472 |
| 33.52 | 2.671 | 63.28 | 1.468 |
| 34.55 | 2.594 | 63.82 | 1.457 |
| 35.20 | 2.548 | 64.22 | 1.449 |
| 35.70 | 2.513 | 65.19 | 1.430 |
| 36.83 | 2.438 | 65.65 | 1.421 |
| 37.44 | 2.400 | 66.44 | 1.406 |
| 38.37 | 2.344 | 67.29 | 1.390 |
| 38.71 | 2.324 | 67.48 | 1.387 |
| 39.75 | 2.266 | 68.34 | 1.372 |
| 41.02 | 2.198 | 69.31 | 1.355 |
| 41.35 | 2.182 | 69.55 | 1.351 |
| 42.35 | 2.133 | | |

What is claimed is:

1. A process for the production of light olefins comprising carrying out a steam cracking reaction of hydrocarbon charges selected from the group consisting of naphtha, kerosene, atmospheric gas oil, vacuum gas oil, and mixtures thereof, in the presence of a catalyst, operating at a temperature ranging from 720 to 800° C., at a pressure ranging from 1.1 to 1.8 absolute Ate. and for a contact time ranging from 0.07 to 0.2 sec, wherein the catalyst consists of pure mayenite having the general formula:

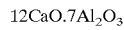

with an X-ray diffraction spectrum as indicated in Table I of the specification.

2. The process according to claim 1, wherein the naphtha is virgin naphtha.

3. The process according to claim 1, wherein the catalyst is prepared by a process which comprises the following steps:
   dissolution of a salt containing calcium and a salt containing aluminum with water;
   complexing of the dissolved salts with a polyfunctional organic hydroxyacid;
   drying of the solution resulting from the complexing in order to obtain a solid precursor product;
   calcination of the solid precursor product at a temperature ranging from 1300 to 1400° C. for at least two hours.

4. The process according to claim 3 wherein the calcination is effected at a temperature ranging from 1330 to 1370° C. for at least 5 hours.

5. The process according to claim 3, wherein the salt containing calcium is selected from calcium acetate and calcium nitrate.

6. The process according to claim 3, wherein the salt containing aluminum is aluminum nitrate.

7. The process according to claim 3, wherein the polyfunctional hydroxyacid is citric acid.

8. The process according to claim 3, wherein the molar ratio polyfunctional hydroxyacid/a salt containing calcium and a salt containing aluminum ranges from 1.5 to 1.

* * * * *